(12) United States Patent
Chen (10) Patent No.: US 11,428,965 B2
(45) Date of Patent: Aug. 30, 2022

(54) LCD PANEL AND DISPLAY DEVICE

(71) Applicant: TCL CHINA STAR OPTOELECTRONICS TECHNOLOGY CO., LTD., Shenzhen (CN)

(72) Inventor: Xingwu Chen, Shenzhen (CN)

(*) Notice: Subject to any disclaimer, the term of this patent is extended or adjusted under 35 U.S.C. 154(b) by 221 days.

(21) Appl. No.: 16/766,713

(22) PCT Filed: May 8, 2020

(86) PCT No.: PCT/CN2020/089117
§ 371 (c)(1),
(2) Date: May 25, 2020

(87) PCT Pub. No.: WO2021/174661
PCT Pub. Date: Sep. 10, 2021

(65) Prior Publication Data
US 2022/0113568 A1  Apr. 14, 2022

(30) Foreign Application Priority Data
Mar. 3, 2020 (CN) .......................... 202010138515.3

(51) Int. Cl.
G02F 1/13 (2006.01)
G02F 1/1343 (2006.01)
G02F 1/1335 (2006.01)

(52) U.S. Cl.
CPC ...... *G02F 1/1323* (2013.01); *G02F 1/133528* (2013.01); *G02F 1/134345* (2021.01)

(58) Field of Classification Search
CPC .................................................. G02F 1/1323
See application file for complete search history.

(56) References Cited

U.S. PATENT DOCUMENTS

| | | | |
|---|---|---|---|
| 2012/0314149 A1* | 12/2012 | Kang | G02F 1/134336 257/E29.273 |
| 2016/0085122 A1 | 3/2016 | Nishihara et al. | |
| 2016/0216569 A1* | 7/2016 | Lee | G02F 1/133707 |
| 2016/0313615 A1 | 10/2016 | Wang et al. | |
| 2017/0235194 A1* | 8/2017 | Shin | G02F 1/134309 349/139 |
| 2018/0052344 A1* | 2/2018 | Suwa | G09G 3/3648 |
| 2018/0129098 A1* | 5/2018 | Yoon | G02F 1/133512 |
| 2019/0179204 A1* | 6/2019 | Bang | G02F 1/13471 |

FOREIGN PATENT DOCUMENTS

| | | |
|---|---|---|
| CN | 102213886 A | 10/2011 |
| CN | 103135273 A | 6/2013 |
| CN | 104216167 A | 12/2014 |

(Continued)

*Primary Examiner* — Edmond C Lau (57) ABSTRACT

The disclosure provides a liquid crystal display (LCD) panel and a display device. The display panel includes a first substrate. A pixel area is defined on a side near a second substrate and includes a plurality of pixel electrodes arranged in an array manner. Each of the pixel electrodes includes at most two domains, and each of the domains includes a plurality of pixel electrode branches which are parallel to and spaced from each other, thereby maximizing light transmittance of the LCD device, realizing high light transmittance display, and ensuring the display panel has good viewing angles.

18 Claims, 4 Drawing Sheets

(56) References Cited

FOREIGN PATENT DOCUMENTS

| | | |
|---|---|---|
| CN | 104749836 A | 7/2015 |
| CN | 105209970 A | 12/2015 |
| CN | 206892500 U | 1/2018 |
| CN | 110824789 A | 2/2020 |
| WO | 2013054773 A1 | 4/2013 |

* cited by examiner

LCD PANEL AND DISPLAY DEVICE

FIELD

The present disclosure relates to the field of display technologies, and more particularly, relates to a liquid crystal display (LCD) panel and a display device.

BACKGROUND

Active thin film transistor liquid crystal display (TFT-LCD) panels have been rapidly developed and widely used in recent years. In current market, mainstream TFT-LCD panels may be divided into three types, namely twisted nematic (TN) type or super twisted nematic (STN) type, in-plane switching (IPS) type, and vertical alignment (VA) type. Among them, VA-type LCD panels are widely used in large-scale displays, such as liquid crystal televisions, due to their extremely high contrast compared with other types of LCD panels.

With development of technologies, some improvements have emerged. Polymer stabilized vertical alignment (PSVA) wide viewing angle technologies allow LCD panels to have advantages such as faster response times and higher light transmittance, and feature multiple polymer protrusions formed on a surface of an alignment film, which allow liquid crystal molecules to have tilt angles. In conventional technologies, adding a chiral agent into liquid crystal molecules, combined with designing different slit angles of electrodes, enable light transmittance of display panels to be increased. However, although the above method may reduce a width of a dark line area to a certain degree, dark lines cannot be completely eliminated. Consequently, light transmittance of display panels cannot be further increased.

SUMMARY

The present disclosure provides an LCD panel and a display device, which are able to solve a problem of low light transmittance of conventional LCD panels.

To solve the above technical problem, a technical solution applied to the present disclosure is providing an LCD panel. The LCD panel includes: a first substrate, wherein a pixel area is defined on a side of the first substrate near a second substrate, the pixel area includes a plurality of pixel electrodes arranged in an array manner, each of the pixel electrodes includes at most two domains, each of the domains includes a plurality of pixel electrode branches, which are parallel to and spaced apart from each other, and the pixel electrode branches are disposed at a plurality of predetermined angles with respect to a polarization direction of a polarization layer near the first substrate or near the second substrate; the second substrate, wherein the second substrate is disposed opposite to the first substrate, and a common electrode is disposed on a side of the second substrate near the first substrate; and a liquid crystal layer, wherein the liquid crystal layer is disposed between the first substrate and the second substrate.

To solve the above technical problem, another technical solution applied to the present disclosure is providing a display device. The display device includes an LCD panel including: a first substrate, wherein a pixel area is defined on a side of the first substrate near a second substrate, the pixel area includes a plurality of pixel electrodes arranged in an array manner, each of the pixel electrodes includes at most two domains, each of the domains includes a plurality of pixel electrode branches, which are parallel to and spaced apart from each other, and the pixel electrode branches are disposed at a plurality of predetermined angles with respect to a polarization direction of a polarization layer near the first substrate or near the second substrate; the second substrate, wherein the second substrate is disposed opposite to the first substrate, and a common electrode is disposed on a side of the second substrate near the first substrate; and a liquid crystal layer, wherein the liquid crystal layer is disposed between the first substrate and the second substrate.

Regarding the beneficial effects: an LCD panel and a display device are provided. A number of domains of pixel electrodes in a pixel area is decreased, that is, the pixel electrodes in the pixel area are single-domain electrodes or double-domain electrodes. A plurality of pixel electrode branches are disposed at predetermined angles with respect to a polarization direction of a polarization layer disposed near a first substrate or near a second substrate. Therefore, light transmittance of LCD devices may be maximized, thereby realizing high light transmittance display panels, and ensuring that viewing angles of the display panels are good.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION

Hereinafter preferred embodiments of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

Unless otherwise defined, all technologies and scientific terms used in the present disclosure have common meanings that are able to be understood by those skilled in the art. All terms used in the present disclosure are only for the purpose of illustrating specific embodiments, but are not intended to limit the present disclosure. Terms "including" and "including" and any variants thereof are intended to cover non-exclusive inclusions. Terms "first", "second", etc. in the specification and claims of the present disclosure and the above figures are used to distinguish similar objects, but are not used to describe a specific order. It should be noted that the objects can be interchanged in an appropriate case.

Specific features, structures, and characteristics, which are mentioned in the present disclosure may be included in at least one embodiment. Phrases in the present disclosure are not necessary to refer to the same embodiment and do not refer to an independent embodiment and an alternative embodiment which are exclusive to other embodiments. It should be explicitly and implicitly understood by those skilled in the art that embodiments described in the present disclosure may be combined with other embodiments.

Figure 1:
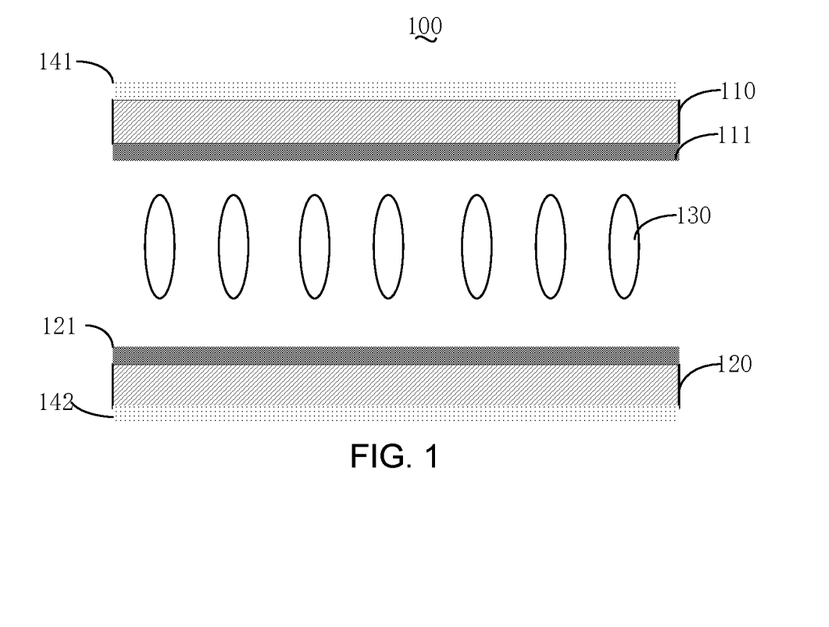
FIG. 1 is a schematic sectional structural view showing an LCD panel according to a first embodiment of the present disclosure.

Please refer to FIG. 1, a schematic sectional structural view showing an LCD panel according to a first embodiment of the present disclosure is provided. An LCD panel 100 includes a first substrate 110, a second substrate 120 disposed opposite to the first substrate 110, and a liquid crystal layer 130 disposed between the first substrate 110 and the second substrate 120.

Selectively, liquid crystal molecules in the liquid crystal layer 130 are negative liquid crystals, and an effective optical path length difference ($\Delta$nd) of the liquid crystal molecules may be 300 nm to 550 nm. Specifically, it may be 300 nm, 375 nm, or 550 nm, and is not limited here. Therefore, light transmittance per unit area may be further increased.

Furthermore, the liquid crystal molecules further include a chiral agent which generates a twisting force to rotate liquid crystal molecules surrounding it, thereby ensuring helical pitches (P) of the liquid crystal molecules are two to ten times greater than a thickness of a liquid crystal cell. The thickness of the liquid crystal cell ranges from 2.5 μm to 4 μm. Specifically, it may be 2.5 μm, 3.25 μm, or 4 μm. Selectively, the helical pitches (P) range from 6 μm to 60 μm. Specifically, they may be 6 μm, 33 μm, or 60 μm. In the above embodiment, the helical pitches of the liquid crystal molecules are adjusted to reduce a dark line area around pixels, thereby increasing light transmittance.

Selectively, in the present disclosure, the first substrate 110 and the second substrate 120 may be a flexible substrate or a normal substrate. Furthermore, the first substrate 110 may be a thin film transistor (TFT) array substrate, and the second substrate 120 may be a color filter substrate. Of course, in other embodiments, the first substrate 110 may also be the color filter substrate, and the second substrate 120 may also be the TFT array substrate, which are not limited here.

A plurality of common electrodes 121 are disposed on a side of the second substrate 120 near the first substrate 110. A plurality of color filter films (not shown), such as red, green, and blue color filters, may further be disposed on the second substrate 120. Furthermore, a photoresist layer (not shown) and a black matrix layer (not shown) may also be added according to a situation. The photoresist layer is configured to realize colorful display, and the black matrix layer is configured to prevent light leakage and provide a thickness of the LCD panel. A specific structure of the second substrate 120 may be referred to conventional technologies, and is not described here.

In addition, an alignment layer (not shown) may be further disposed on the first substrate 110 and the second substrate 120, thereby aligning the liquid crystal molecules. Selectively, after the first substrate 110 and the second substrate 120 are formed, the liquid crystal layer needs to be disposed therebetween. In the present disclosure, the liquid crystal layer may be disposed by inkjet printing or other methods, which is not limited here. After that, the first substrate 110 and the second substrate 120 are attached to each other to form a liquid crystal cell.

It should be noted that the LCD panel may further include a polarization layer. The polarization layer includes a first polarization layer 141 and a second polarization layer 142. The first polarization layer 141 is disposed on a side of the first substrate 110 away from the second substrate 120, the second polarization layer 142 is disposed on a side of the second substrate 120 away from the first substrate 110, and a polarization direction of the first polarization layer 141 and a polarization direction of the second polarization layer 142 are orthogonal. Please refer to FIG. 2, a schematic view showing a relationship between a polarization direction of a polarization layer and a display panel is provided. An included angle between at least one of the first polarization layer 141 or the second polarization layer 142 and a lateral edge of a printed circuit board of the LCD panel 100 is less than or equal to 10 degrees.

Figure 2:
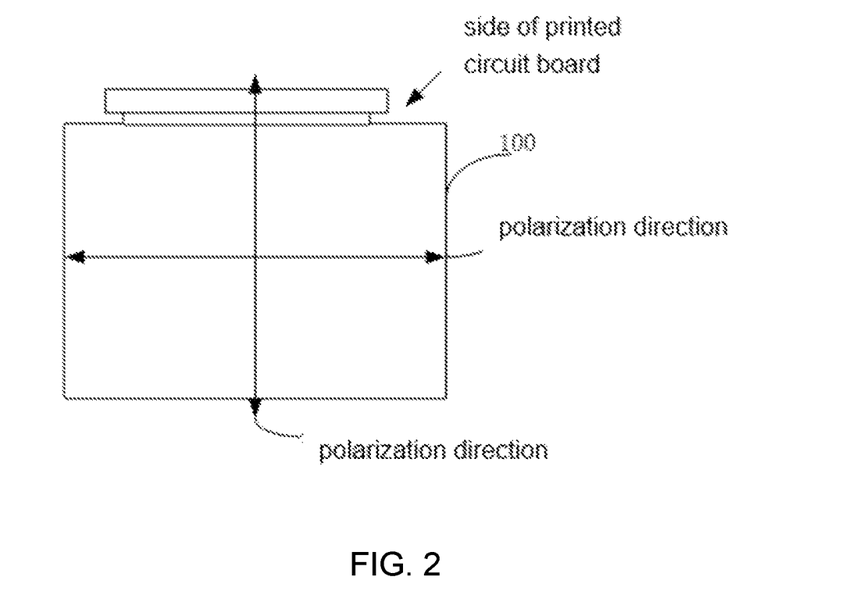
FIG. 2 is a schematic view showing a relation between a polarization direction of a polarization layer and a display panel.

Please simultaneously refer to FIG. 1 and FIG. 2 and have a look at a specific structure of a pixel area on a top of the first substrate 110 (array substrate). The pixel area is defined on a side of the first substrate 110 near the second substrate 120. A plurality of pixel electrodes 111 arranged in an array manner are disposed in the pixel area, each of the pixel electrodes 111 at most includes two domains, and each of the domains includes a plurality of pixel electrode branches 1111, which are parallel to and spaced apart from each other. The pixel electrode branches 1111 are disposed at predetermined angles with respect to a polarization direction of a polarization layer near the first substrate 110 or near the second substrate.

Figure 3:
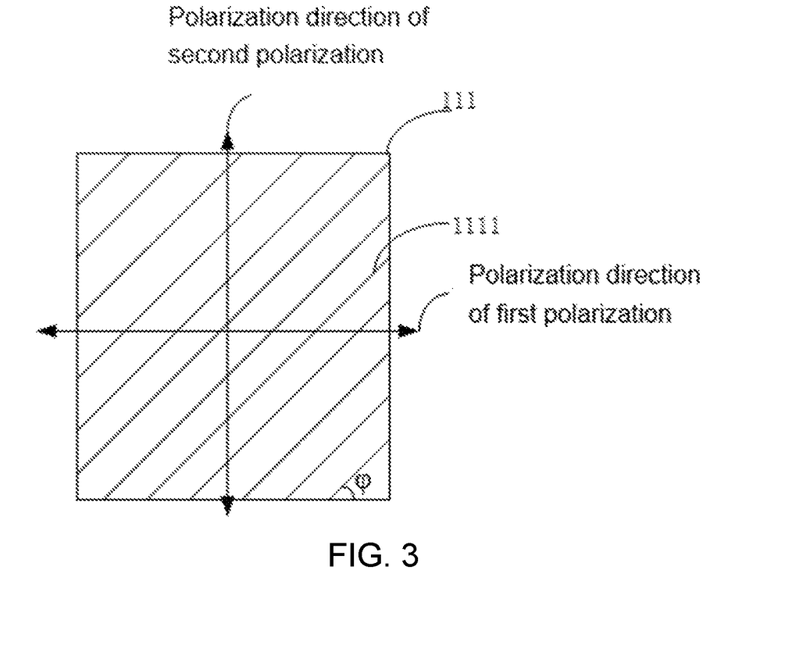
FIG. 3 is a schematic structural view showing a pixel electrode according to the first embodiment of the present disclosure.

Please refer to FIG. 3, a schematic structure view showing a pixel electrode according to the first embodiment of the present disclosure is provided. A pixel electrode 111 may be a single-domain electrode, and the pixel electrode branches 1111 of the pixel electrodes 111 in adjacent rows and/or columns and a polarization direction of the first polarization layer 141 or the second polarization layer 142 have a same predetermined angle. In FIG. 3, the pixel electrode branches 1111 of the pixel electrodes 111 arranged in an array manner are disposed at an angle of φ with respect to a polarization direction of the first polarization layer 141. That is, all pixel electrode branches 1111 of the pixel electrodes 111 are disposed at a same angle with respect to the polarization direction of the first polarization layer 141, and a relationship between such angle and the helical pitches (P) of the liquid crystal molecules in the liquid crystal layer 130 correspond to each other. Specifically, as shown in following table.

TABLE 1

Relationships between the helical pitches of the liquid crystal molecules and the predetermined angles of the polarization layer

| Pitch | left-handed liquid crystals | Right-handed liquid crystals |
|---|---|---|
| P ≤ 11 | 75 ≤ φ ≤ 90 or 165 ≤ φ ≤ 180 | 0 ≤ φ ≤ 15 or 90 ≤ φ ≤ 105 |
| 11 ≤ P ≤ 13.5 | 75 ≤ φ ≤ 85 or 165 ≤ φ ≤ 175 | 5 ≤ φ ≤ 15 or 95 ≤ φ ≤ 105 |
| 13.5 ≤ P ≤ 16 | 70 ≤ φ ≤ 90 or 160 ≤ φ ≤ 175 | 0 ≤ φ ≤ 20 or 95 ≤ φ ≤ 110 |
| 16 ≤ P ≤ 18.5 | 65 ≤ φ ≤ 90 or 155 ≤ φ ≤ 175 | 5 ≤ φ ≤ 25 or 95 ≤ φ ≤ 115 |
| 18.5 ≤ P | 60 ≤ φ ≤ 90 or 150 ≤ φ ≤ 175 | 10 ≤ φ ≤ 30 or 95 ≤ φ ≤ 120 |

As shown in Table. 1, different liquid crystal molecules (left-handed liquid crystals or right-handed liquid crystals) have different helical pitches, and the angles of the pixel electrode branches 1111 of the pixel electrodes 111 with respect to the polarization direction of the first polarization layer 141 are changed along with the helical pitches, thereby satisfying the above conditions.

Figure 4:
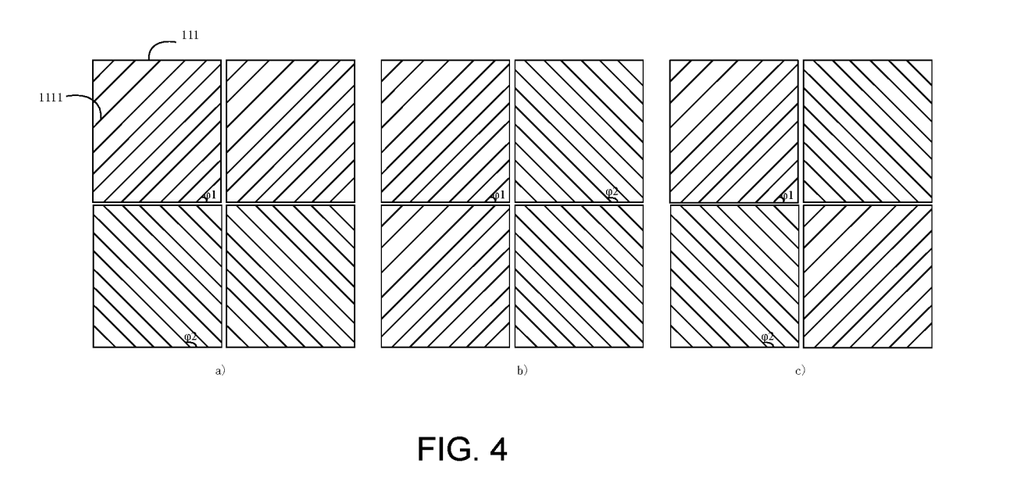
FIG. 4 is a schematic structural view showing a pixel electrode according to a second embodiment of the present disclosure.

Please refer to FIG. 4, a schematic structural view showing a pixel electrode according to a second embodiment of the present disclosure is provided. The second embodiment is an alternative based on the first embodiment. A difference between the first embodiment and the second embodiment is: in the second embodiment, predetermined angles of the pixel electrode branches 1111 of the pixel electrodes 111 in adjacent rows and/or columns with respect to the polarization direction of the polarization layer are different.

Selectively, the predetermined angles include a first predetermined angle of φ1 and a second predetermined angle of φ2, wherein a difference therebetween ranges from 80 degrees to 100 degrees. Furthermore, both the first predetermined angle of φ1 and the second predetermined angle of φ2 satisfy the relationships between the helical pitches of the liquid crystal molecules and the predetermined angles shown in Table. 1.

Please refer to FIG. 4, each of the pixel electrodes 111 is a single-domain electrode, a disposing way of the pixel electrode branches 1111 of the pixel electrodes 111 in adjacent rows or columns with respect to the polarization direction of the polarization layer may be referred to FIG. 4a: repeating arrangement in every two rows. For example, the pixel electrode branches 1111 in an $n^{th}$ row are disposed at a predetermined angle of φ1 with respect to the polarization direction of the polarization layer, the pixel electrode branches 1111 in an n+1$^{th}$ row are disposed at a predetermined angle of φ2 with respect to the polarization direction of the polarization layer, and a difference between the predetermined angle of φ1 and the predetermined angle of φ2 ranges from 80 degrees to 100 degrees. Specifically, it may be 80 degrees, 90 degrees, or 100 degrees. In one embodiment of the present disclosure, the difference between the predetermined angles of the pixel electrode branches in adjacent rows is 90 degrees.

Please refer to FIG. 4b, a disposing way may also be: repeating arrangement in every two columns. For example, the pixel electrode branches 1111 in an $n^{th}$ column are disposed at a predetermined angle of φ1 with respect to the polarization direction of the polarization layer, the pixel electrode branches 1111 in an n+1th column are disposed at a predetermined angle of φ2 with respect to the polarization direction of the polarization layer, and a difference between the predetermined angle of φ1 and the predetermined angle of φ2 ranges from 80 degrees to 100 degrees. Specifically, it may be 80 degrees, 90 degrees, or 100 degrees. In one embodiment of the present disclosure, the difference between the predetermined angles of the pixel electrode branches in adjacent columns is 90 degrees.

Please refer to FIG. 4c, the pixel electrodes in different rows and columns may also be spaced from each other at the same time, and a difference between predetermined angles of the pixel electrode branches in different rows and columns with respect to the polarization direction of the polarization layer ranges from 80 degrees to 100 degrees. Specifically, it may be 80 degrees, 90 degrees, or 100 degrees. In one embodiment of the present disclosure, the difference between the predetermined angles of the pixel electrode branches in adjacent rows and adjacent columns is 90 degrees.

It should be understood that the disposing way of pixel electrodes in the present disclosure may be repeated every other row/column, and may also be repeated every multiple rows/columns. For example, the disposing way of the pixel electrodes may be repeated every two rows/columns, or may be repeated every three rows/columns, which is not limited here.

In the above embodiments, a number of domains of the pixel electrodes in the pixel area is reduced. That is, the pixel electrodes are single-domain electrodes, which can maximize light transmittance of the LCD device and realize high light transmittance display. Furthermore, the pixel electrode branches of the pixel electrodes are arranged and combined according to an angle of the predetermined direction of the polarization layer to form multiple domains, thereby ensuring the display panel has good viewing angles.

Figure 5:
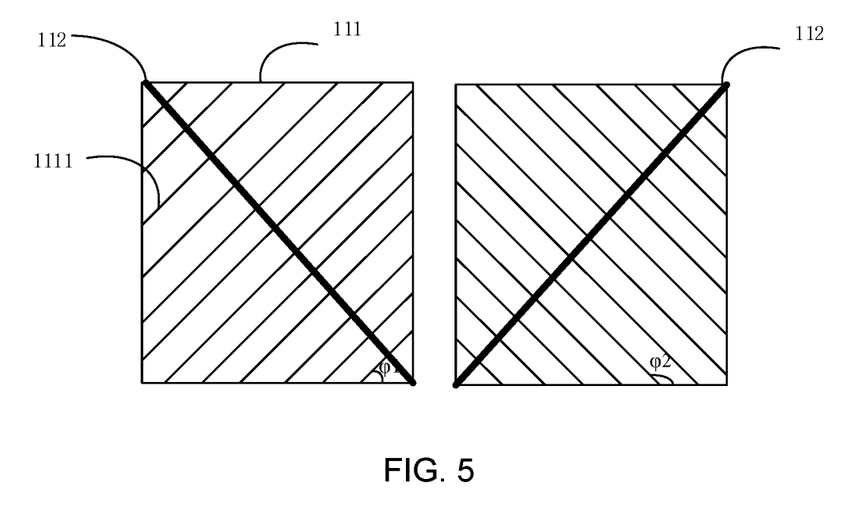
FIG. 5 is a schematic structural view showing a pixel electrode according to a third embodiment of the present disclosure.

Please refer to FIG. 5, a schematic structural view showing a pixel electrode according to a third embodiment of the disclosure is provided. The third embodiment is an alternative based on the first embodiment and the second embodiment. A difference therebetween is: in the third embodiment, each of the pixel electrodes includes a first trunk disposed along a diagonal of the pixel electrodes.

As shown in FIG. 5, each of the pixel electrodes includes a first trunk 112 disposed along a diagonal of the pixel electrodes. By disposing the first trunk 112, an alignment of the LCD panel 100 may be improved.

Figure 6:
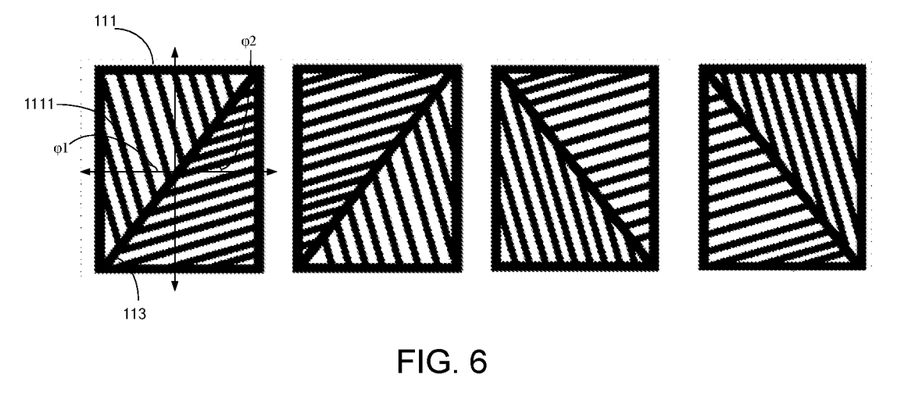
FIG. 6 is a schematic structural view showing a pixel electrode according to a fourth embodiment of the present disclosure.
Figure 7:
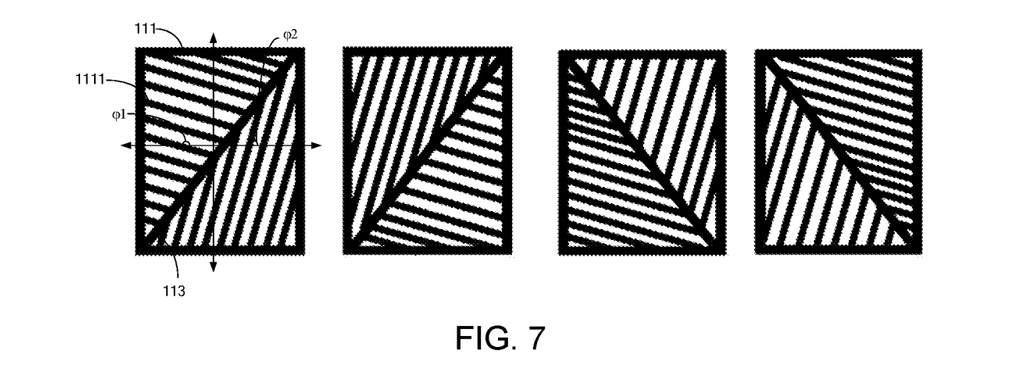
FIG. 7 is a schematic structural view showing a pixel electrode according to a fifth embodiment of the present disclosure.

Please refer to FIG. 6 and FIG. 7, FIG. 6 is a schematic structural view showing a pixel electrode according to a fourth embodiment of the present disclosure, and FIG. 7 is a schematic structural view showing a pixel electrode according to a fifth embodiment of the present disclosure. Embodiments in FIG. 6 and FIG. 7 are alternatives based on the first embodiment, the second embodiment, and the third embodiment. A difference therebetween is: in the fourth embodiment and the fifth embodiment, each of the pixel electrodes 111 includes a second trunk 113. The second trunk 113 divides the pixel electrodes into two domains, and the pixel electrode branches 1111 disposed in each of the domains are disposed at different predetermined angles with respect to the polarization direction of the polarization layer. Please refer to FIG. 6 and FIG. 7, FIG. 6 shows a disposing way of a pixel electrode when liquid crystal molecules in the liquid crystal layer 130 are right-handed liquid crystals, and FIG. 7 shows a disposing way of a pixel electrode when liquid crystal molecules in the liquid crystal layer 130 are left-handed liquid crystals. Specifically, embodiments in FIG. 6 and FIG. 7 are alternatives based on the first embodiment, the second embodiment, and the third embodiment. In FIG. 6 and FIG. 7, all of the pixel electrodes 111 are divided into two domains by the second trunk 113, that is, each of the pixel electrodes includes a first predetermined angle of φ1 and a second predetermined angle of φ2 with respect to the polarization direction of the polarization layer. Differences between predetermined angles of pixel electrode branches 1111 in adjacent domains with respect to the polarization direction of the polarization layer range from 80 degrees to 100 degrees. Specifically, they may be 80 degrees, 90 degrees, or 100 degrees. Moreover, in one embodiment, difference between predetermined angles are 90 degrees. Furthermore, both the first predetermined angle of φ1 and the second predetermined angle of φ2 satisfy the relationships between the helical pitches of the liquid crystal molecules and the predetermined angles shown in Table. 1.

In the above embodiments, a number of the domains of the pixel electrodes in the pixel area is reduced. That is, the pixel electrodes are double-domain electrodes, which can maximize light transmittance of the LCD device and realize high light transmittance display. Furthermore, the pixel electrode branches of the pixel electrodes are arranged and combined according to an angle of the predetermined direction of the polarization layer to form multiple domains, thereby ensuring the display panel has good viewing angles.

Figure 8:
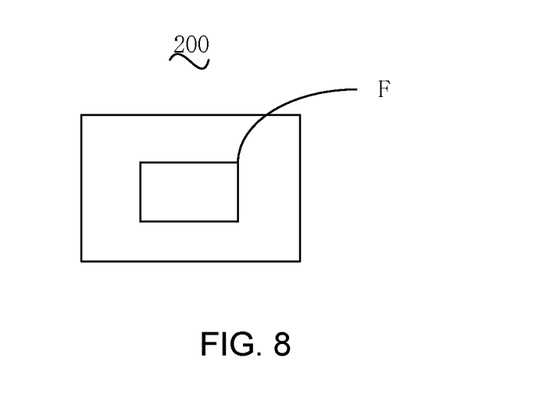
FIG. 8 is a schematic structural view showing a display device according to one embodiment of the present disclosure.

Please refer to FIG. 8, a schematic structural view showing a display device according to one embodiment is provided. The present embodiment provides a display device 200 including a display panel F. A specific structure of the display panel F can be referred to the above embodiments, and are not described here.

In summary, it is simple for those skilled in the art to understand that the present disclosure provides a display panel and a display device. A number of domains of pixel electrodes in a pixel area is decreased, that is, the pixel electrodes in the pixel area are single-domain electrodes or double-domain electrodes. A plurality of pixel electrode branches are disposed at predetermined angles with respect to a polarization direction of a polarization layer disposed near a first substrate or near a second substrate. Therefore, light transmittance of LCD devices may be maximized, thereby realizing high light transmittance display panels, and ensuring that viewing angles of the display panels are good.

The above descriptions are only embodiments which do not limit the patent scope of the present disclosure. Equivalent structure or equivalent process transformations based on the description of the present disclosure and the contents of the drawings, for example, the combination of technical features between the embodiments, or directly or indirectly applied in other related technical fields, are included within the scope of patent protection of the present disclosure.

What is claimed is:

1. A liquid crystal display (LCD) panel, comprising:
a first substrate, wherein a pixel area is defined on a side of the first substrate near a second substrate, the pixel area comprises a plurality of pixel electrodes arranged in an array manner, each of the pixel electrodes comprises at most two domains, each of the domains comprises a plurality of pixel electrode branches which are parallel to and spaced apart from each other, and the pixel electrode branches are disposed at a plurality of predetermined angles with respect to a polarization direction of a polarization layer near the first substrate or near the second substrate;
the second substrate, wherein the second substrate is disposed opposite to the first substrate, and a common electrode is disposed on a side of the second substrate near the first substrate; and
a liquid crystal layer, wherein the liquid crystal layer is disposed between the first substrate and the second substrate;
wherein each of the pixel electrodes comprises a first trunk arranged along a diagonal of the pixel electrodes, and an included angle between one of the pixel electrode branches disposed on a side of the first trunk and the first trunk and an included angle between one of the electrode branches disposed on another side of the first trunk and the first trunk are different.

2. The LCD panel of claim 1, wherein the pixel electrodes are single-domain electrodes, and the predetermined angles of adjacent pixel electrode branches of the pixel electrodes in a row and/or a column with respect to the polarization direction of the polarization layer are same.

3. The LCD panel of claim 2, wherein a relationship between the predetermined angles of the pixel electrode branches with respect to the polarization direction of the polarization layer and helical pitches of a plurality of liquid crystal molecules in the liquid crystal layer correspond to each other.

4. The LCD panel of claim 2, wherein the predetermined angles comprise a first predetermined angle and a second predetermined angle, and a difference between the first predetermined angle and the second predetermined angle ranges from 80 degrees to 100 degrees.

5. The LCD panel of claim 1, wherein the pixel electrodes are single-domain electrodes, and the predetermined angles of adjacent pixel electrode branches of the pixel electrodes in a row and/or a column with respect to the polarization direction of the polarization layer are different.

6. The LCD panel of claim 1, wherein each of the pixel electrodes comprises a second trunk, the second trunk divides the pixel electrodes into two domains, and the pixel electrode branches disposed in each of the domains are disposed at different predetermined angles with respect to the polarization direction of the polarization layer.

7. The LCD panel of claim 6, wherein a difference between the predetermined angles of the pixel electrode branches disposed in adjacent domains with respect to the polarization direction of the polarization layer ranges from 80 degrees to 100 degrees.

8. The LCD panel of claim 1, wherein a relationship between the predetermined angles of the pixel electrode branches with respect to the polarization direction of the polarization layer and helical pitches of a plurality of liquid crystal molecules in the liquid crystal layer correspond to each other.

9. The LCD panel of claim 8, wherein the liquid crystal molecules comprise a chiral agent, and the helical pitches of the liquid crystal molecules are two to ten times greater than thicknesses of the LCD panel and a liquid crystal cell.

10. The LCD panel of claim 1, wherein the polarization layer comprises a first polarization layer and a second polarization layer, the first polarization layer is disposed on a side of the first substrate away from the second substrate, the second polarization layer is disposed on a side of the second substrate away from the first substrate, and a polarization direction of the first polarization layer and a polarization direction of the second polarization layer are orthogonal; and
an included angle between at least one of the first polarization layer or the second polarization layer and a lateral edge of a printed circuit board of the LCD panel is less than or equal to 10 degrees.

11. A display device, comprising a liquid crystal display (LCD) panel;

wherein the LCD panel comprises:
a first substrate, wherein a pixel area is defined on a side of the first substrate near a second substrate, the pixel area comprises a plurality of pixel electrodes arranged in an array manner, each of the pixel electrodes comprises at most two domains, each of the domains comprises a plurality of pixel electrode branches which are parallel to and spaced apart from each other, and the pixel electrode branches are disposed at a plurality of predetermined angles with respect to a polarization direction of a polarization layer near the first substrate or near the second substrate;
the second substrate, wherein the second substrate is disposed opposite to the first substrate, and a common electrode is disposed on a side of the second substrate near the first substrate; and
a liquid crystal layer, wherein the liquid crystal layer is disposed between the first substrate and the second substrate;
wherein each of the pixel electrodes comprises a first trunk arranged along a diagonal of the pixel electrodes, and an included angle between one of the pixel electrode branches disposed on a side of the first trunk and the first trunk and an included angle between one of the electrode branches disposed on another side of the first trunk and the first trunk are different.

12. The display device of claim 11, wherein the pixel electrodes are single-domain electrodes, and predetermined angles of adjacent pixel electrode branches of the pixel electrodes in a row and/or a column with respect to the polarization direction of the polarization layer are same.

13. The display device of claim 11, wherein the predetermined angles comprise a first predetermined angle and a second predetermined angle, and a difference between the first predetermined angle and the second predetermined angle ranges from 80 degrees to 100 degrees.

14. The display device of claim 11, wherein each of the pixel electrodes comprises a second trunk, the second trunk divides the pixel electrodes into two domains, and the pixel electrode branches disposed in each of the domains are disposed at different predetermined angles with respect to the polarization direction of the polarization layer.

15. The display device of claim 14, wherein a difference between the predetermined angles of the pixel electrode branches disposed in adjacent domains with respect to the polarization direction of the polarization layer ranges from 80 degrees to 100 degrees.

16. The display device of claim 11, wherein a relationship between the predetermined angles of the pixel electrode branches with respect to the polarization direction of the polarization layer and helical pitches of a plurality of liquid crystal molecules in the liquid crystal layer correspond to each other.

17. The display device of claim 16, wherein the liquid crystal molecules comprise a chiral agent, and the helical pitches of the liquid crystal molecules are two to ten times greater than thicknesses of the LCD panel and a liquid crystal cell.

18. The display device of claim 11, wherein the polarization layer comprises a first polarization layer and a second polarization layer, the first polarization layer is disposed on a side of the first substrate away from the second substrate, the second polarization layer is disposed on a side of the second substrate away from the first substrate, and a polarization direction of the first polarization layer and a polarization direction of the second polarization layer are orthogonal; and
an included angle between at least one of the first polarization layer or the second polarization layer and a lateral edge of a printed circuit board of the LCD panel is less than or equal to 10 degrees.

* * * * *